Aug. 22, 1933.  J. BOHLI  1,923,184
MAGNETO-ELECTRIC IGNITION APPARATUS
Filed April 9, 1931
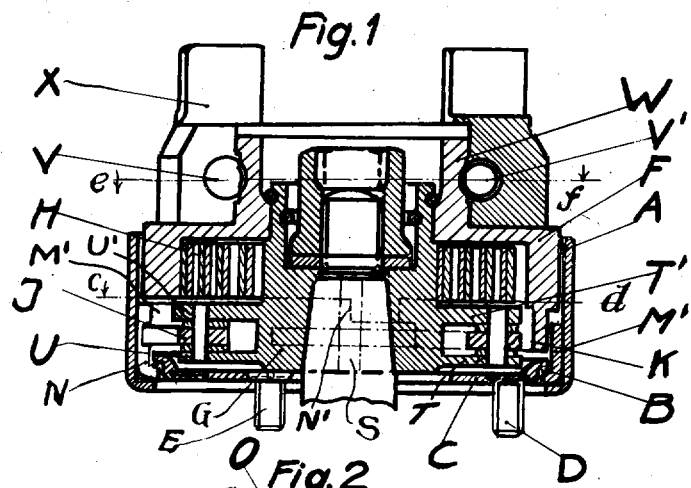

Patented Aug. 22, 1933

1,923,184

UNITED STATES PATENT OFFICE 1,923,184

MAGNETO-ELECTRIC IGNITION APPARATUS

Jakob Bohli, Solothurn, Switzerland, assignor to Scintilla Aktiengesellschaft, Solothurn, Switzerland Application April 9, 1931, Serial No. 528,991, and in Germany March 10, 1930

4 Claims. (Cl. 123—149)

This invention relates to break couplings of the kind used for magneto-electric ignition apparatus for facilitating the starting up of an internal combustion engine by an intermittent drive. The couplings of this kind hitherto placed on the market are generally complicated and therefore expensive to manufacture.

According to the present invention the hub of the driven part of the coupling is made with two oppositely disposed pairs of arms for the reception of the pawls, one arm of one pair of arms having a radially outwardly directed extension which, when the coupling is in the disengaged position rests against a stop on the inner periphery of the driving part of the coupling. The hub of the driven part of the coupling furthermore has the form of a worm wheel, in the teeth of which the thread of the clamping screw of a dog clutch engages.

In the accompanying drawing such a break coupling is shown. Fig. 1 is a longitudinal section and Fig. 2 a horizontal section through the coupling. Fig. 3 is a cross section on line $e f$ of Fig. 1. In Fig. 1 A is the stationary coupling casing which together with an annular segment M, rigidly fixed to it, and an annular segment M' capable of being turned in the peripheral direction with respect to the latter and a disc C forms an adjusting device which is known per se. F is the driving part of the coupling and G the driven part which is keyed to the armature shaft of the magneto-electric ignition apparatus. H is the tensioning spring disposed between these two halves of the coupling and J and K are the pawls. The outer ring of the driving half F of the coupling is provided with a slot for the attachment of one end of the tensioning spring H, while the hub of the driven part G of the coupling has two slots P and Q, into which the other end of the spring H is inserted for right-handed and left-handed operation of the coupling. In the hub of the driven part G of the coupling there are further provided two keyways R and S for right-handed and left-handed operation and in addition the hub is provided with two oppositely disposed pairs of arms T and U, between each of which a pawl J and K is pivoted. The slots P and Q and the keyways R and S are disposed symmetrically with respect to the centre line of the said two pairs of arms. When changing the coupling from one direction of rotation to the other, the pawls J and K must also be turned about the centre line of the arms S and T through 180°. One arm of one pair of arms projects radially outwards beyond the other one, so that, in the disengaged position of the coupling, the former can rest against a stop on the inner periphery of the driving half F of the coupling. In the engaged position the pawls rest against one end of the annular segment M' which is disposed at the inner periphery of the coupling casing and in this way temporarily arrest the part G of the coupling and with it the rotor of the magneto, until by a cam L disposed on the outer periphery of the part F of the coupling the pawl is caused to become disengaged.

The break coupling and with it the magneto can be adjusted with respect to the piston position of the internal combustion engine by the whole of the break coupling and with it the magneto being made capable of being turned with respect to its driving member. This is effected by means of a worm gear, the hub of the driving part F of the break coupling being formed as a worm wheel W, in which the thread of the clamping screws V of a dog clutch part X engages. The dog clutch part X connects the magneto including the break coupling with the driving member in a known manner, not shown in the drawing. For effecting the adjustment, one of the screws V is turned and the slotted dog clutch part X is thereupon clamped with the second screw V on the hub of the driving part F of the break coupling.

The break coupling according to the present invention is composed of a minimum number of parts, is therefore cheap to manufacture and furthermore provides a simple means for adjusting the magnet with respect to the internal combustion engine.

What I claim is:

1. In a coupling with trip mechanism for magneto electric ignition apparatus, a hub of the driven coupling half being provided with two oppositely disposed pairs of arms, for receiving the pawls, of which one arm of one pair of arms has a radially outwardly directed extension which, when the coupling is in the disengaged position rests against a stop on the inner periphery of the driving coupling half, the hub of the driving coupling half having the form of a worm wheel in the teeth of which the thread of a screw of a dog clutch half engages.

2. In a coupling with trip mechanism for magneto electric ignition apparatus, a hub of the driven coupling half being provided with two oppositely disposed pairs of arms, for receiving the pawls, of which one arm of one pair of arms has a radially outwardly directed extension which, when the coupling is in the disengaged position rests against a stop on the inner periphery of the driving coupling half, said pawls being arranged between the 2 arms of each pair of arms and pivoted on a thin pin which is journaled in each of said two arms on the outer end of the same, a hub of the driving coupling half having the form of a worm wheel in the teeth of which the thread of a screw of a dog clutch half engages.

3. In a coupling with trip mechanism for magneto electric ignition apparatus, a hub of the driven coupling half being provided with two oppositely disposed pairs of arms, for receiving the pawls, of which one arm of one pair of arms has a radially outwardly directed extension which, when the coupling is in the disengaged position rests against a stop on the inner periphery of the driving coupling half, said pawls being arranged between the 2 arms of each pair of arms and pivoted on a thin pin which is journaled in said two arms on the outer end of the same, a hub of the driving coupling half having the form of a worm wheel in the teeth of which the thread of a screw of a dog clutch half engages, said dog clutch being split and secured in its position by means of a clamping screw.

4. In a coupling with trip mechanism for magneto electric ignition apparatus, a hub of the driven coupling half being provided with two oppositely disposed pairs of arms, for receiving the pawls, of which one arm of one pair of arms has a radially outwardly directed extension which, when the coupling is in the disengaged position rests against a stop on the inner periphery of the driving coupling half, said pawls being arranged between the 2 arms of each pair of arms and pivoted on a thin pin which is journaled in said two arms on the outer end of the same, said hub of the driven part of the coupling half having 2 sets of keyways and slots disposed symmetrically with respect to the center line of said two pairs of arms, a hub of the driving coupling half having the form of a worm wheel in the teeth of which the thread of a screw of a dog clutch half engages, said dog clutch being split and secured in its position by means of a clamping screw.

JAKOB BOHLI.